United States Patent
Sun et al.

(10) Patent No.: US 7,057,851 B2
(45) Date of Patent: Jun. 6, 2006

(54) DIVERSION OF TANGENTIAL AIRFLOW IN A DISC DRIVE

(75) Inventors: Xiaohong Sun, Prior Lake, MN (US); Lance Thoresen, Burnsville, MN (US); Xu Zuo, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/458,784

(22) Filed: Jun. 10, 2003

(65) Prior Publication Data

US 2004/0252405 A1    Dec. 16, 2004

(51) Int. Cl.
*G11B 33/14*    (2006.01)
(52) U.S. Cl. ............................................. 360/97.02
(58) Field of Classification Search ............. 360/97.02, 360/97.03
See application file for complete search history.

(56) References Cited

U.S. PATENT DOCUMENTS

| | | | |
|---|---|---|---|
| 5,134,530 A | 7/1992 | Hall | |
| 5,907,453 A | 5/1999 | Wood | |
| 6,369,978 B1 | 4/2002 | Shimizu | |
| 6,507,462 B1 | 1/2003 | Gibbs | |
| 2002/0075592 A1 | 6/2002 | Tokuyama | |
| 2002/0097525 A1 | 7/2002 | Rao | |
| 2002/0135933 A1 | 9/2002 | Harrision | |
| 2002/0149876 A1 | 10/2002 | Sakata | |
| 2002/0181148 A1 | 12/2002 | Dahlenburg | |
| 2002/0181149 A1 | 12/2002 | Shimizu | |
| 2003/0202275 A1* | 10/2003 | Adams | 360/97.02 |
| 2003/0202276 A1* | 10/2003 | Smith | 360/97.02 |
| 2003/0210492 A1* | 11/2003 | Adams et al. | 360/97.02 |

* cited by examiner

*Primary Examiner*—David D. Davis
(74) *Attorney, Agent, or Firm*—Westman, Champlin & Kelly

(57) ABSTRACT

A disc drive includes a housing surrounding a voice coil in a voice coil cavity, and a disc in a disc cavity. The disc has data tracks and an outer diameter. The disc rotates to induce an airflow along the outer diameter. The voice coil actuates an actuator arm in the disc cavity to access the data tracks. An air dam is in the disc cavity upstream of the actuator arm. The airflow includes a straight line tangent airflow portion along a straight edge of a shroud that is free of obstructions and upstream of the air dam. The straight line airflow portion extends from an arc airflow portion around the outer diameter to the voice coil cavity along a straight line path tangent to the outer diameter.

23 Claims, 5 Drawing Sheets

DIVERSION OF TANGENTIAL AIRFLOW IN A DISC DRIVE

FIELD OF THE INVENTION

The present invention relates generally to control of airflow, and more particularly but not by limitation to control of circulating airflow in a disc drive.

BACKGROUND OF THE INVENTION

In disc drives, the positioning of a read/write head relative to a track that is being accessed is subject to non-repeatable runout errors. One component of the non-repeatable runout error is due to the instability of airflow patterns that are generated by the rotating disc. Unstable airflow impacts on actuator arms and head gimbal assemblies (HGAs) that position the read/write heads over the discs. The unstable airflow excites various mechanical vibration modes that cause arm/HGA off-track motion which results in non-repeatable runout errors. In particular, arm/HGA sway and arm/HGA torsion modes are typically excited. As areal density of disc drives increase, and the speed of rotation of the discs increases in new designs, the problems with non-repeatable runout due to unstable airflow patterns becomes worse.

A method and apparatus are needed that will reduce non-repeatable runout errors in disc drives with higher areal densities and higher speeds. Embodiments of the present invention provide solutions to these and other problems, and offer other advantages over the prior art.

SUMMARY OF THE INVENTION

Disclosed is a disc drive that includes a housing surrounding a voice coil in a voice coil cavity, and a disc in a disc cavity. The disc is rotated and induces a generally circular airflow over disc surfaces, in particular, along an outer diameter of the disc. The voice coil actuates an actuator arm in the disc cavity to access data tracks on the disc. An air dam is in the disc cavity upstream of the actuator arm. The airflow includes a straight line tangent airflow portion extending from an arc airflow portion around the outer diameter to the voice coil cavity along a straight line path tangent to the outer diameter that is free of obstruction due to protrusions. The straight line tangent airflow portion flows along a straight wall of a shroud.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
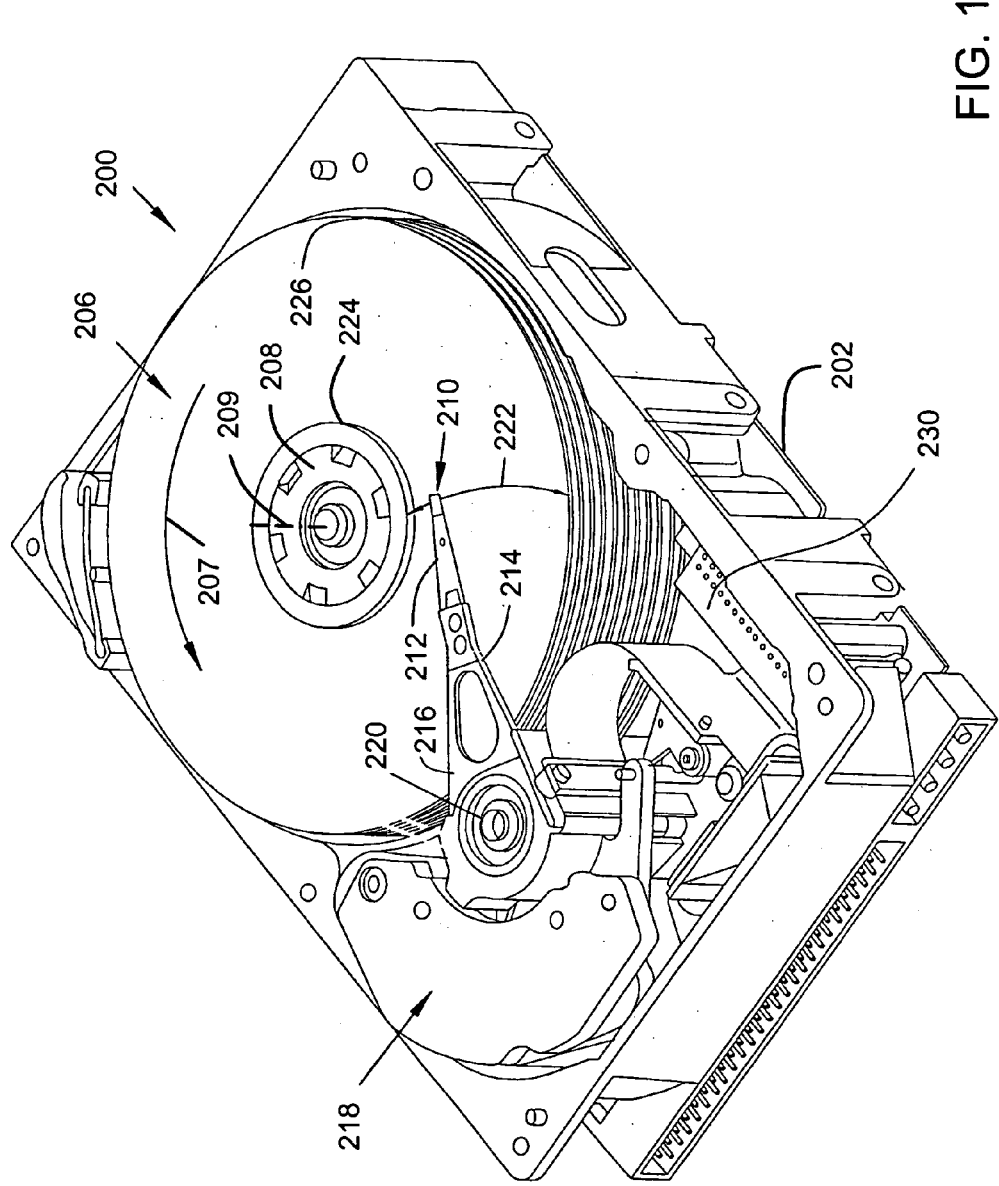
FIG. 1 illustrates an oblique view of a disc drive.

FIG. 1 illustrates an oblique view of a disc drive 200 in which embodiments of the present invention can be implemented. Disc drive 200 includes a housing with a base 202 and a top cover (not shown). Disc drive 200 further includes a disc pack 206, which is mounted on a spindle motor (not shown) by a disc clamp 208. Disc pack 206 includes a plurality of individual discs, which are mounted for co-rotation in a direction indicated by arrow 207 about central axis 209. Each disc surface has an associated disc read/write head slider 210, suspension 212 and actuator arm 216 that are mounted to disc drive 200 for communication with the disc surface. The actuator shown in FIG. 1 is of the type known as a rotary moving coil actuator and includes a voice coil motor (VCM), shown generally at 218. Voice coil motor 218 rotates actuator 216 with its attached read/write heads 210 about a pivot shaft 220 to position read/write heads 210 over a desired data track along an arcuate path 222 between a disc inner diameter 224 and a disc outer diameter 226. Voice coil motor 218 is driven by electronics 230 based on signals generated by read/write heads 210 and a host computer (not shown). The disc drive 200 also includes a retractable air dam (not illustrated) with arms positioned upstream of the suspensions 212 and actuator arms 214 during normal operation.

Figure 2:
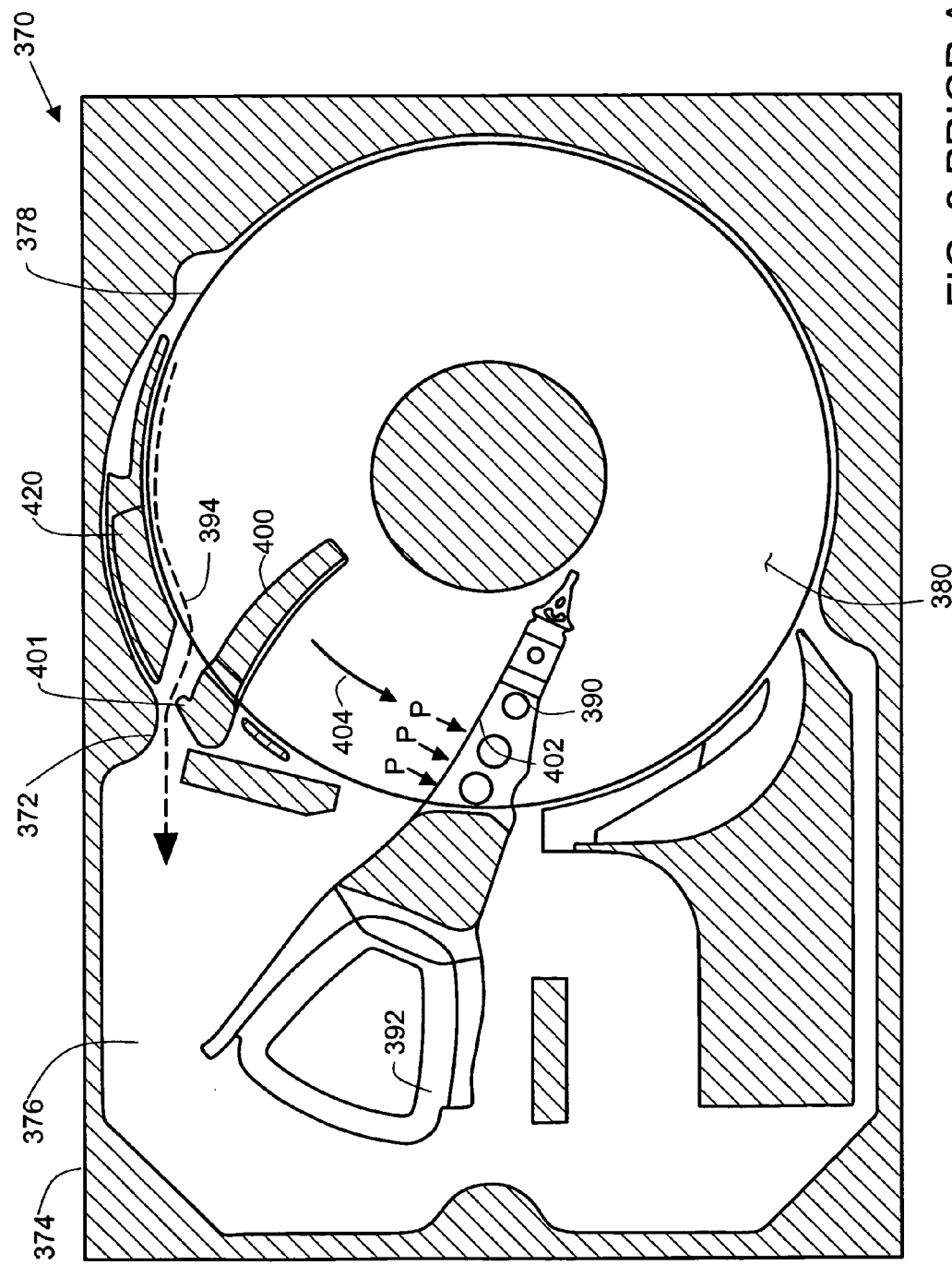
FIG. 2 illustrates a cross sectional view of a PRIOR ART disc drive.

FIG. 2 illustrates a cross sectional view of a PRIOR ART disc drive 370. The disc drive 370 comprises a housing 374 that surrounds a voice coil cavity 376 and a disc cavity 378. The voice coil cavity 376 comprises an air space in which a voice coil 392 moves. The disc cavity 378 comprises an air space in which a disc 380 rotates. The disc cavity 378 is bounded by a shroud 420.

An actuator arm 390 in the disc cavity 378 accesses data tracks. The voice coil 392 moves in the voice coil cavity 376 and actuates the actuator arm 390 for accessing a selected data track. The disc 380 is rotated for accessing data on the data tracks and the rotating induces an airflow 394 (indicated by a dashed line) that turns, or changes direction, flowing around a protrusion 372 of the housing 374, the shroud 420, and a solid ridge 401 of air dam 400 before flowing into the voice coil cavity 376. The airflow 394, which is induced by rotating multiple discs 380, is carried along a continuous recirculating airflow path.

The protrusion 372 is an obstruction to airflow 394 that generates resistance to airflow and backpressure. The air dam 400 in the disc cavity 378 is positioned upstream of the actuator arm 390. The air dam 400 diverts the airflow 394 from travelling toward the actuator arm 390. The air dam 400 diverts the airflow 394 toward the obstruction 372. The actuator arm 390 has an upstream edge 402 that is subject to unstable pressurization P due to an airflow 404 that impacts the upstream edge 402. The obstructions 372, 401, 420 generate back pressure and increases the volume of airflow 404 and increases unstable pressurization P on the upstream edge 402. The actuator arm 390 has a position relative to a data track 382 that is subject to non-repeatable runout, and the unstable pressurization P increases the non-repeatable runout.

As illustrated in FIG. 2 PRIOR ART, the obstructed airflow 394 is upstream of the air dam 400. The shroud 420 is mounted adjacent the disc cavity 378 and also protrudes and blocks airflow 394. A solid ridge 401 of the air dam 400 prevents straight air flow. There is not a straight line airflow path upstream of the air dam 400 and a considerable amount of back pressure builds upstream of air dam 400, resulting in considerable flow past the air dam 400 that impacts the upstream edge 402, resulting in high non-repeatable runout. The arrangement in FIG. 2 does not have a straight line tangent airflow portion that flows along a straight wall and that extends from the outer diameter to the voice coil cavity. The arrangement show in FIG. 2 does not have a straight line tangent airflow portion that is unimpeded by protrusions or turns between the outer diameter and the voice coil cavity.

This problem is solved as described below in connection with examples illustrated in FIGS. 3–5.

Figure 3:
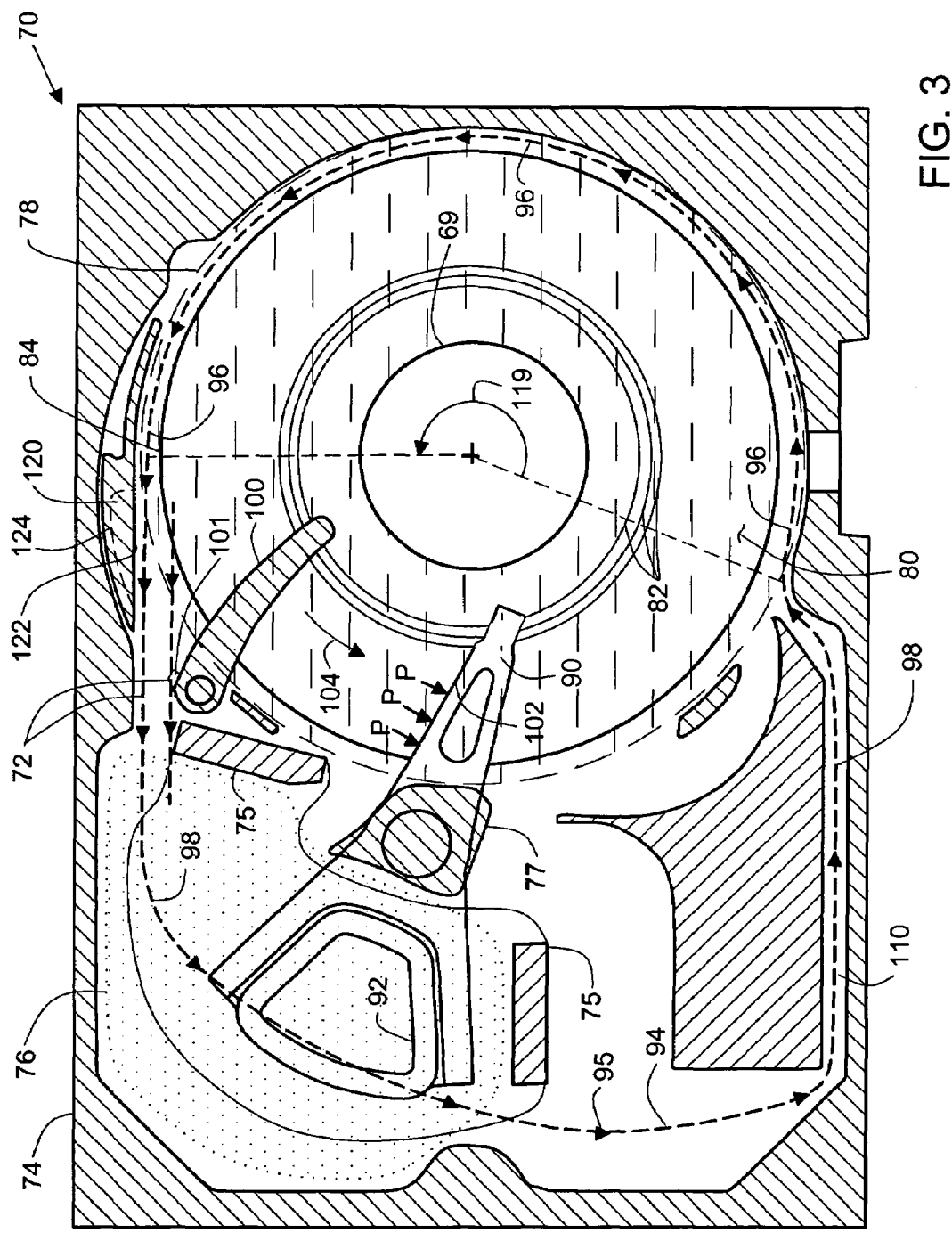
FIG. 3 illustrates a cross sectional view of a disc drive including a tangent air path.
Figure 4:
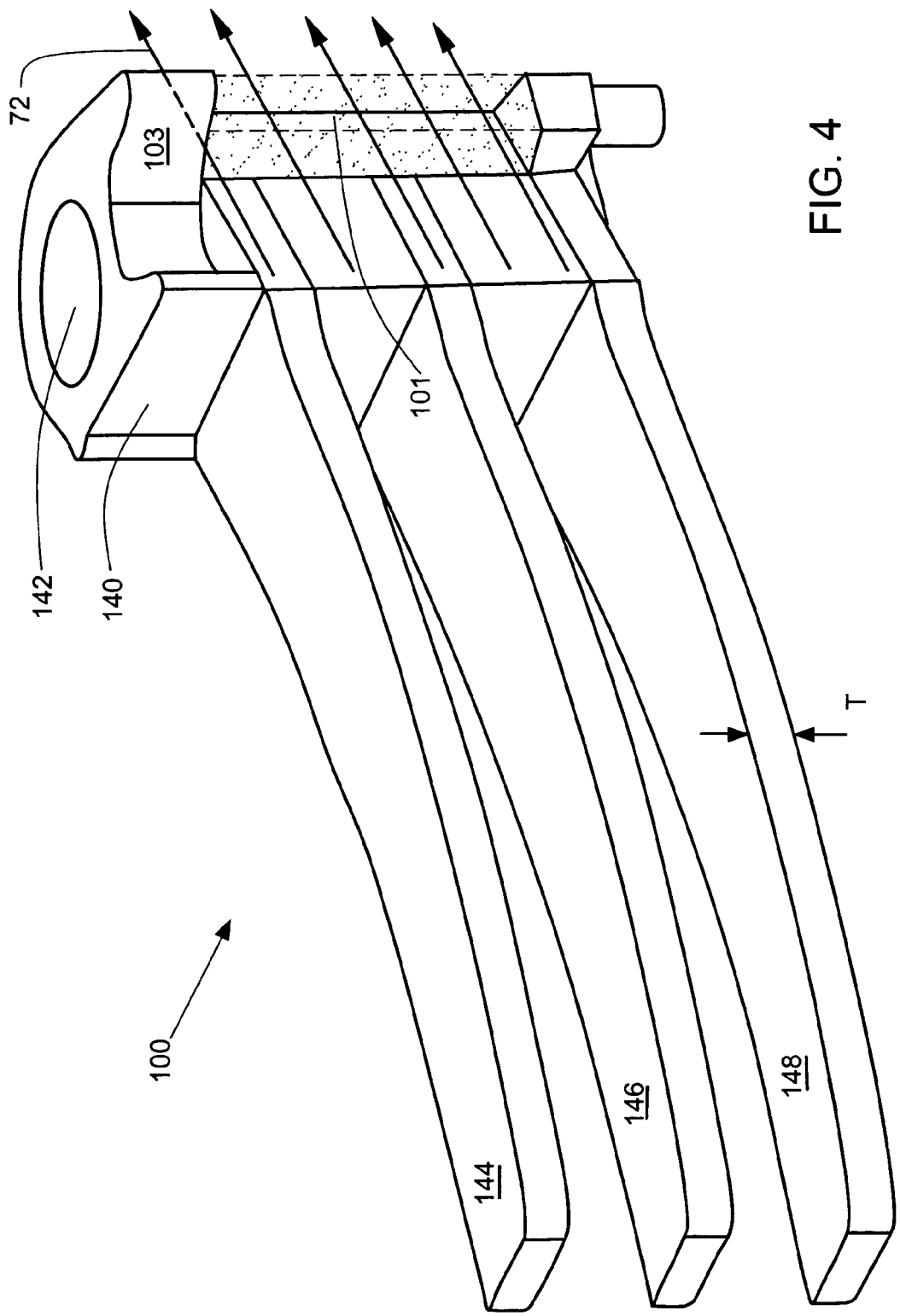
FIG. 4 illustrates an oblique view of an air dam.
Figure 5:
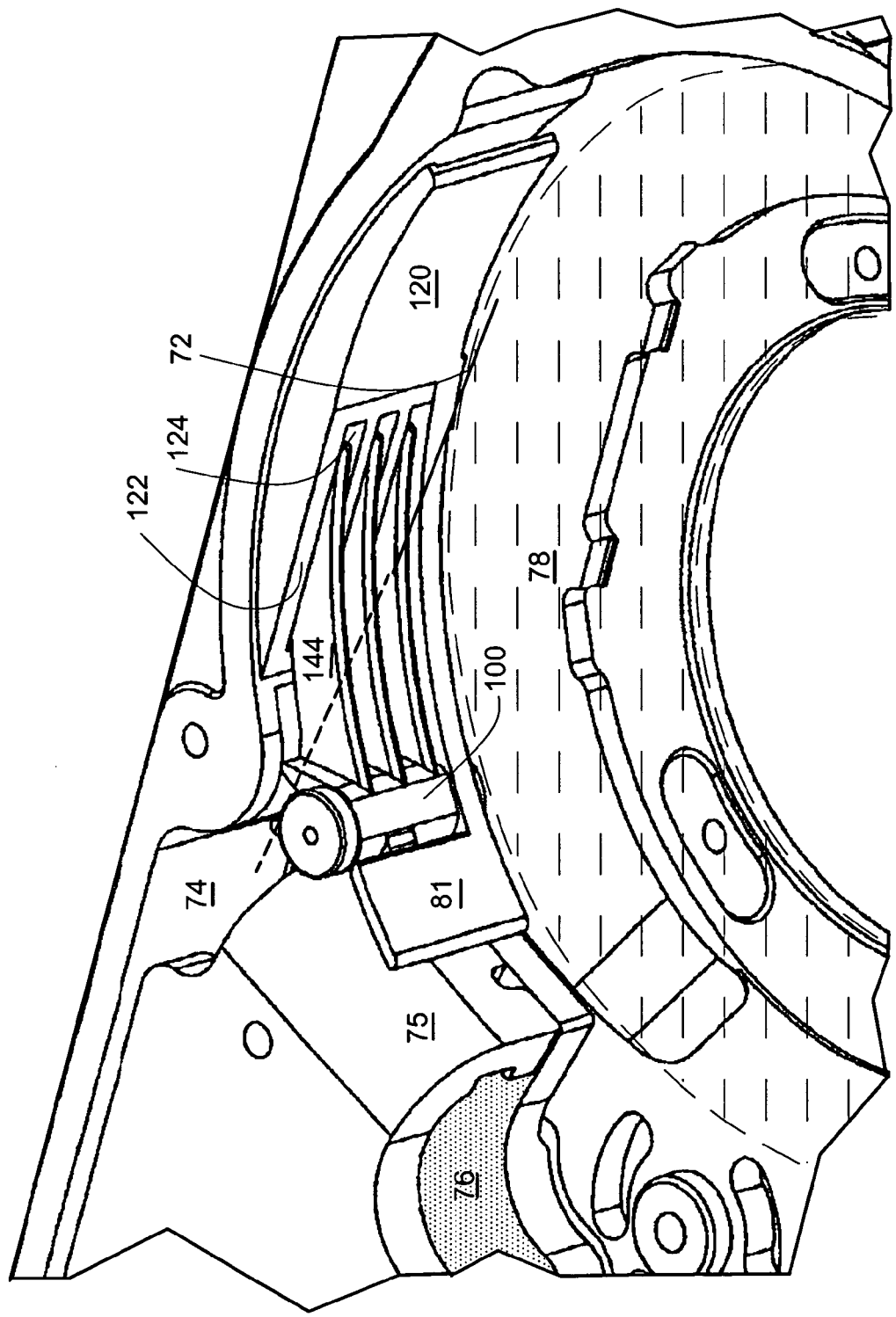
FIG. 5 illustrates an oblique view of an air dam and a shroud mounted in a partially assembled disc drive.

In the embodiments illustrated in FIGS. 3–5, a disc drive includes an air dam and an airflow path that includes a straight line tangential airflow portion that is tangential to an outer diameter between the outer diameter and a voice coil cavity. The tangential airflow portion is free of turns and protrusions. Both the straight line tangential airflow portion and the air dam are upstream of an actuator arm. Through the use of the tangential airflow path and the air dam, airflow is effectively diverted from impacting an upstream edge of the actuator arm. The tangential airflow path reduces windage excitation of various vibration modes that cause non-repeatable runout, especially the coupled tracking arm/head gimbal assembly (HGA) sway mode, the tracking arm/HGA torsion mode, and the head stack assembly (HSA) rocking mode. Additionally, cooling of the voice coil motor can be improved with the higher airflow rate through the voice coil cavity. Non-repeatable runout is reduced and fewer read errors are encountered in operation.

FIG. 3 illustrates a cross sectional view of a disc drive 70. The disc drive 70 comprises a housing 74 that surrounds a voice coil cavity 76 (indicated generally by a dotted region) and a disc cavity 78 (indicated generally by a dashed region). The voice coil cavity 76 comprises an air space in which a voice coil 92 moves. The voice coil cavity 76 is preferably bounded, as illustrated, by the housing 74, a magnetic pole shoe (permanent magnet) assembly 75 and a voice coil motor hub 77. The disc cavity 78 comprises an air space in which a disc 80 rotates. The disc cavity 78 is preferably bounded, as illustrated, by the housing 74, the voice coil motor hub 77, a spindle motor 69 and a shroud 120.

An actuator arm 90 in the disc cavity 78 accesses data tracks 82. The voice coil 92 moves in the voice coil cavity 76 and actuates the actuator arm 90 for accessing a selected data track 82.

The disc 80 is mounted on the spindle motor 69 in the disc cavity 78. The disc 80 includes a peripheral outer diameter (also called a disc rim) 84. The disc 80 is rotated for accessing data on the data tracks 82 and the rotating induces an airflow 94. The disc 80 is stacked vertically with other similar discs that are spaced apart from one another, leaving an air space between the discs for movement of actuator arms 90 and for airflow. The airflow 94, which is induced by rotating multiple discs 80, is carried along a continuous airflow closed loop path indicated by a dashed line including arrows 95 indicating a direction of the airflow.

The airflow 94 includes an arc airflow portion 96 that is in the disc cavity 78 along the outer diameter 84. The airflow 94 also includes a straight line tangent airflow portion 72 that is tangent to the outer diameter 84 and extends from a tangent point on the outer diameter 84 to the voice coil cavity 76. The straight line tangent airflow portion 72 travels along a path that is not obstructed by protrusions such as those described above in connection with FIG. 2. The airflow 94 includes an extended return path portion 98 that passes through the voice coil cavity 76 and returns to the disc cavity 78. A return passage 110 carries the airflow 94 from the voice coil cavity 76 back to the arc airflow portion 96. The airflow 94 is preferably a continuously recirculating airflow as illustrated. The straight line tangent airflow portion 72 is free of turns or obstructions that could generate resistance to flow and backpressure. The straight line tangent airflow portion 72 opens into the voice coil motor cavity 76, which is wider than the portion 72 and offer little resistance to airflow. As illustrated in FIG. 3, the straight line tangent airflow portion 72 is upstream of the air dam 100. The arc portion 96 of the airflow 94 extends along an angle 119 that is at least 180 degrees around the outer diameter 84.

An air dam 100 in the disc cavity 78 is positioned upstream of the actuator arm 90. The air dam 100 diverts the airflow 96 from travelling toward the actuator arm 90. The air dam 100 diverts the airflow 96 toward the straight line tangent airflow portion 72. The actuator arm 90 has an upstream edge 102 that is subject to unstable pressurization P due to an airflow 104 that impacts the upstream edge 102. The arrangement with the straight line tangent airflow portion 72 and the air dam 100 reduces the volume of airflow 104 and reduces unstable pressurization P on the upstream edge 102. Air flows to the voice coil cavity 76 more effectively without detouring around a bypass behind the shroud 120.

The arrangement of the straight line tangent airflow portion 72 and the air dam 100 reduces non-repeatable runout in the position of the actuator arm 90 relative to a data track 82.

The shroud 120 is mounted adjacent the disc cavity 78 and adjacent the straight line tangent airflow portion 72. The shroud 120 includes a straight wall 122 that defines a boundary for the straight line tangent airflow portion 72. The straight line tangent airflow portion 72 flows along the straight wall 122. The shroud 120 includes retraction cavities 124 (described below in connection with FIG. 5). The air dam 100 includes a notch 101 that is cut away such that the air dam 100 does not protrude into the straight line tangent air flow portion 72. The straight line tangent airflow flows through the notch as illustrated in FIG. 4. The air dam 100 is retractable into the retraction cavities 124 as explained in more detail below in connection with FIGS. 4–5.

FIG. 4 is an oblique view of the air dam 100. The air dam 100 comprises a central hub 140 surrounding a bore 142 which engages a pin or axle protruding from the disc drive housing 70 (as illustrated in FIG. 3). Multiple air dam arms 144, 146, 148 protrude from the central hub 140. Each air dam arm 144, 146, 148 has a thickness T which fits between two stacked discs 80 (as illustrated in FIG. 3) and serves to block airflow 104 (illustrated in FIG. 3) to reduce pressure on the upstream edge 102 of actuator arm 90 (FIG. 3). The air dam 100 can be rotated counterclockwise on central hub 140 so that the air dam arms 144, 146, 148 retract into retraction cavities 124 in the shroud 120 (as illustrated in FIG. 5), leaving the disc cavity 78 clear for installation of the discs 80. After discs 80 are installed, the air dam 100 can be rotated into an operating position (as illustrated in FIG. 3).

A previous air dam design included a solid ridge (such as ridge 401 in FIG. 2) on the back that protruded into the bypass channel, significantly blocking airflow. In one arrangement, the ridge reduced the effective bypass flow cross-section by about 50%. In the disclosed arrangement, the ridge is removed and the air dam 100 includes a notch 101 (indicated by a stippled region in FIG. 4) where the previous ridge protruded. Only a part of the ridge was removed to form notch 101, leaving a top of the ridge 103 that is used to rotate the air dam. The straight line tangent airflow 72 passes through the notch 101 tangent to the flow direction at the outer diameter 84. The path of the straight line tangent airflow 72 is free of obstructions, and forms an effective diversion of airflow away from the actuator arm 90.

FIG. 5 is an oblique view of an air dam 100 and a shroud 120 mounted in a partially assembled disc drive such as disc drive 70 of FIG. 3. In FIG. 5, the air dam arm 144 is illustrated in a retracted position in a retraction cavity 124 of shroud 120. The air dam 144 is installed at an earlier assembly process, and the discs 80 are installed at a later assembly processes. The air dam 144 can be temporarily rotated into the retraction cavity 124 while the discs 80 are being installed, and then the air dam 144 can be moved back into its operational position where its air dam arms 144, 146, 148 interleave with the installed discs 80.

In summary, a disc drive (such as 70) includes a housing (such as 74) surrounding a voice coil cavity (such as 76) and disc cavity (such as 78). A voice coil (such as 92) is in the voice coil cavity. A disc (such as 80) is in the disc cavity. The disc has data tracks (such as 82) and an outer diameter (such as 84). The disc is rotated and induces an airflow (such as 94) along the outer diameter. A actuator arm (such as 90) in the disc cavity is actuatable by the voice coil to access the data tracks. An air dam (such as 100) is in the disc cavity upstream of the actuator arm. The airflow including a straight line tangent airflow portion (such as 72) extending from an arc airflow portion (such as 96) around the outer diameter to the voice coil cavity along a straight line path tangent to the outer diameter. The straight line tangent airflow portion is upstream of the air dam, is free of protrusions (such as 372), and flows along a straight wall (such as 122) of a shroud (such as 120).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a multiple disc system, it will be appreciated by those skilled in the art that the teachings of the present invention can be applied to a single disc system, without departing from the scope and spirit of the present invention.

What is claimed is:

1. A disc drive, comprising:
   a housing surrounding a voice coil cavity and a disc cavity;
   a disc rotatably mounted in the disc cavity, the disc having an outer diameter where the disc rotates to induce an arc airflow portion along a portion of the outer diameter;
   a shroud that includes a straight wall extending from the outer diameter to the voice coil cavity;
   an actuator arm in the disc cavity;
   a notched air dam in the disc cavity upstream of the actuator arm, wherein the air dam includes a ridge with a cut-out notch such that the ridge does not protrude into or impede the airflow generated by the rotating disc; and
   the airflow including a straight line tangent airflow portion that flows along the straight wall and that extends from the outer diameter to the voice coil cavity, the straight line tangent airflow portion flowing through the cut-out notch and being unimpeded by protrusion of the ridge into the straight line tangent airflow portion.

2. The disc drive of claim 1, wherein the actuator arm has an upstream edge subject to unstable pressurization.

3. The disc drive of claim 2 wherein the straight line tangent airflow portion and the notched air dam divert airflow away from the upstream edge to reduce the unstable pressurization.

4. The disc drive of claim 1, wherein the actuator arm has a position relative to a data track on the disc that is subject to non-repeatable runout.

5. The disc drive of claim 4 wherein the straight line tangent airflow portion and the notched air dam reduce the unstable pressurization of the actuator arm and thus non-repeatable runout.

6. The disc drive of claim 1, wherein the straight line tangent airflow portion is upstream of the notched air dam.

7. The disc drive of claim 1 wherein the arc airflow portion extends along an angle of at least 180 degrees around the outer diameter.

8. The disc drive of claim 1 further comprising a return passage at an airflow outlet of the voice coil cavity, the return passage carrying a return path portion of the airflow from the voice coil cavity back to the arc airflow portion.

9. The disc drive of claim 1 wherein the arc airflow portion is a continuously recirculating airflow.

10. The disc drive of claim 1 wherein the shroud defines an outer boundary of the straight line tangent airflow portion.

11. The disc drive of claim 1 wherein the shroud includes retraction cavities, and the air dam is retractable into the retraction cavities.

12. A method of directing airflow within a disc drive, comprising:
    providing a housing surrounding a voice coil cavity and disc cavity;
    rotating a disc in the disc cavity to induce an airflow;
    actuating an actuator arm in the disc cavity to access the data tracks by using a voice coil in a voice coil cavity;
    directing the airflow along a passage that includes an arc airflow portion along an outer diameter of the disc, and a straight line tangent airflow portion that flows along a straight wall of a shroud and that is tangent to the outer diameter and that extends to the voice coil cavity; and
    positioning a notched air dam in the disc cavity upstream of the actuator arm such that the straight line tangent airflow portion flows through a cut-out notch in a ridge of the notched air dam and is unimpeded by protrusions of the ridge of the notched air dam into the straight line tangent airflow portion.

13. The method of claim 12 wherein the straight line tangent airflow portion is upstream of the notched air dam.

14. The method of claim 12 further comprising reducing unstable pressurization of an upstream edge of the actuator arm.

15. The method of claim 12, further comprising reducing non-repeatable runout of the actuator arm relative to a data track.

16. The method of claim 12 further comprising extending the arc airflow portion at least 180 degrees around the outer diameter.

17. The method of claim 12 further comprising carrying the airflow along a return passage from the voice coil cavity back to the arc airflow portion of the passage.

18. The method of claim 12 further comprising continuously recirculating the airflow.

19. A disc drive, comprising:
- a housing surrounding a voice coil cavity and a disc cavity;
- a disc rotatably mounted in the disc cavity, the disc having an outer diameter; the disc rotation inducing an airflow along a portion of the outer diameter;
- an actuator arm in the disc cavity;
- a shroud;
- a notched air dam having a ridge with a cut-out notch; and
- means for diverting the airflow away from the actuator arm along a straight line tangent airflow path free of obstructions along a straight wall of the shroud into the voice coil cavity, and the airflow flowing through the cut-out notch in the ridge.

20. The disc drive of claim 19 wherein the means for diverting reduces unstable pressurization of an upstream edge of the actuator arm.

21. The disc drive of claim 19 wherein the means for diverting reduces non-repeatable runout of the actuator arm relative to a data track.

22. The disc drive of claim 19 further comprising a return passage carrying the airflow from the voice coil cavity back to the means for diverting.

23. The disc drive of claim 19 further comprising continuously recirculating the airflow.

* * * * *